July 19, 1955  P. G. DOUGLASS  2,713,412
CURVED CONVEYOR
Filed Aug. 20, 1951

Inventor
Phillip G. Douglass, Deceased, by
Magaret A. W. Douglass, Administratrix By

2,713,412

CURVED CONVEYOR

Philip Gordon Douglass, deceased, late of Shepperton-on-Thames, England, by Margaret Ada Wilhelmina Douglass, administratrix, Shepperton-on-Thames, England, assignor to J. Lyons & Company Limited, London, England, a British company Application August 20, 1951, Serial No. 242,754

5 Claims. (Cl. 198—182)

The present invention relates to conveyors.

In co-pending United States patent application No. 170,741 filed on the 28th June, 1950 and now Patent No. 2,679,920 granted June 1, 1954, there is described a selective transport system one possible use of which is for the delivery of trays of food from a kitchen to receiving stations in a restaurant. In this system the trays may be transported on a conveyor and it may not be possible to arrange that the conveyor follows a straight path. Similarly, a return conveyor may be provided for the return of dirty crockery to the kitchen and this also may have to follow a curved path.

It is one object of the present invention, therefore, to provide conveyors which can follow a curved path. The use of such conveyors is, of course, not limited to the transport of food or crockery, but they are particularly applicable for such use because relatively smooth conveyance is required.

According to the present invention there is provided a conveyor, part at least of the path of which is curved, comprising one or more endless belts which at least during the curved portion of the path travel with the major surfaces of the, or each, belt in substantially vertical planes.

The invention also provides a conveyor comprising two endless belts adapted to provide substantially parallel tracks for conveyance, said belts being positioned, at least during the portion of their travel when they are adapted to convey, with their major surfaces in substantially vertical planes, and guide means for preventing articles being conveyed thereon from inadvertently leaving the tracks.

One arrangement of conveyor according to the present invention will now be described, by way of example, in which the conveyor is particularly adapted for the conveyance of trays of food and drink.

Figure 2:
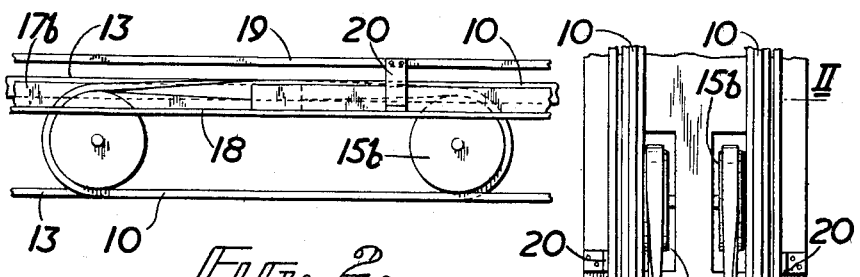
Figure 3:
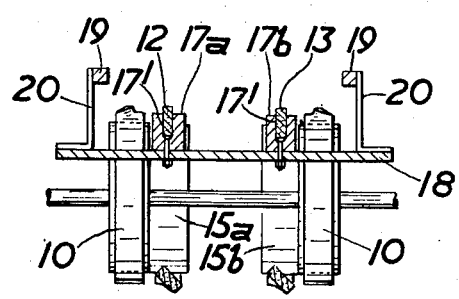
Figure 1:
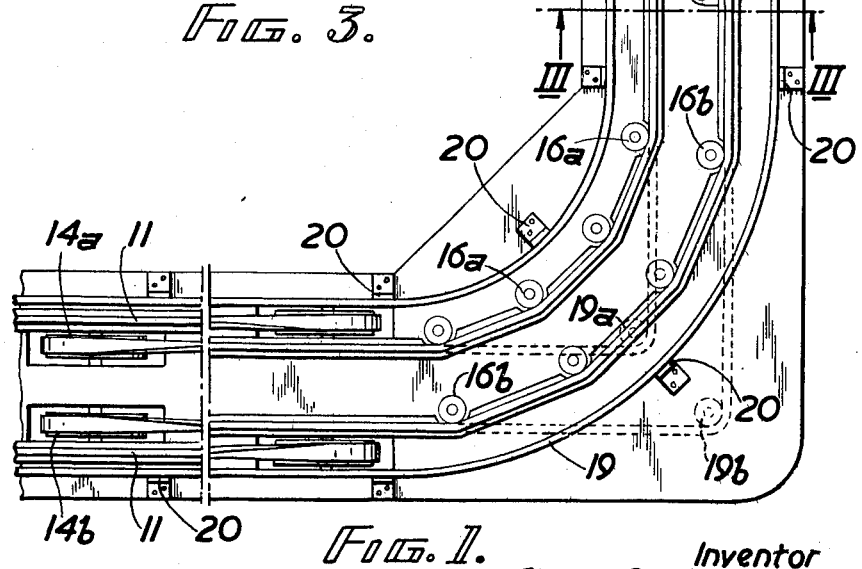

The arrangement will be described with reference to the accompanying drawings, in which:

Figure 1 is a plan view of part of a conveyor system showing the conveyor according to the invention and which forms a part of the system, Figure 2 is a side elevation of the system between the lines II—II in Figure 1 with the guide tracks removed, and Figure 3 is an end elevation along the line III—III in Figure 1.

The conveyor system may be broadly of the kind described and shown in the aforesaid co-pending application, but with the high speed conveyor including at least two straight portions at right angles to one another. A conveyor according to the invention is then used for completing the system between these two straight portions, this conveyor being designed to follow a curved path.

Referring now to the drawings, Figure 1 shows the two portions 10 and 11 respectively of the high speed conveyor. The curved conveyor consists of two endless leather belts 12 and 13, each belt passing around driven pulleys 14a, 14b, at one end of the track and idler pulleys 15a, 15b, at the other, all four pulleys being mounted with their axes of rotation horizontal. Each of the belts 12 and 13 is guided during its forward travel around the curved portion by four spaced idler pulleys 16a and 16b respectively which are positioned to turn the belt 12, 13, through a right angle, the roughly curved portion thus consisting of three short straight portions inclined to one another and to the two straight portions 10 and 11, said straight portions being located in tracks 21.

The axes of rotation of the idler pulleys 16 and 17 are vertical, that is to say at right angles to the corresponding axes of the pulleys 14 and 15, so that the major surfaces of the belts 12 and 13 lie in a vertical plane during their passage around the pulleys 14 and 15. Furthermore in order to maintain the belts 12 and 13 with their major surfaces in a vertical plane during the gerater part of their forward path tracks 17a and 17b are provided which are secured to a supporting base 18. The tracks 17a and 17b may conveniently be of hardwood or metal, and as shown most clearly in Figure 3 are each formed with a groove $17^1$ in which the belt 12, 13, fits. The depth of the groove $17^1$ is arranged to be such that the upper edge of the belt 12, 13, projects only slightly above the upper surface of the track 17. The belts are parallel to one another during their forward travel and are at a suitable spacing for supporting trays on their upper edges.

It will be seen, therefore, that over the major part of their forward path the belts 12, 13 are maintained with their major surfaces lying in a substantially vertical plane, such an arrangement facilitating the turning of the belts 12, 13 through a curved path. Although the pulleys 14 and 15 could be arranged with their axes of rotation vertical, the above described arrangement requires less width.

The return path of the belts 12 and 13 may be in any convenient position, but in the arrangement shown in the drawings it is beneath the level of the forward path of the belts. Single idler pulleys 19a, 19b are provided for turning the belts 12, 13 through a right angle, and these pulleys 19a and 19b may be mounted so that their position can be adjusted for tensioning their respective belt.

The pulleys associated with the portions 10 and 11 of the high speed conveyor are positioned so that each end of the curved conveyor overlaps with one end of the respective portion 10, 11 of the main conveyor. As can be seen from Figure 2, the turning of the belts on leaving their pulleys causes the level of one edge to rise, and the overlap is made sufficient to take account of this so that during their passage trays remain at the same level. Two guide strips 19, which may be of hardwood or metal, are mounted on the outside of the conveyor track to guide trays supported on the belts. The guide strips 19 are supported at suitable intervals by brackets 20 (see Figure 3) secured to base 18.

Although only one curved portion has been provided in the arrangement described, it will be apparent that by appropriate arrangement of guide rollers the conveyor path may have many other shapes. It will also be clear that many other modifications may be made in the particular arrangement described. Thus, for example, instead of the curved conveyor comprising two belts, a single continuous belt might be used which is doubled on itself to form the two tracks. Moreover, it is not necessary to use separate belts for the curved and straight portions of the conveyor. In one arrangement using a single belt, over straight portions of the forward path the belt is maintained with its major surfaces in horizontal planes, but is turned so that these surfaces lie in vertical planes over curved portions of the track. This twisting of the belt can be effected by suitably positioned rollers. The belt will then only need to be supported in a track when turned into the vertical planes. Such a conveyor is suitable for use in a selective transport system of the kind referred to in the aforesaid patent application, for the return of empty trays or dirty crockery where a certain amount of rocking of the articles during conveyance is acceptable. Such rocking may occur due to the rise and fall in the belt which occurs when it twists.

It may be stated by way of example that in one actual construction of conveyor in accordance with the invention the belts used were 1½ inches wide by ⅜ inch thick and only ⅛ inch of belt projected above the track which was of hardwood. The distance between the inner surfaces of the belts on the forward path was one foot. This particular conveyor was designed to transport trays at a velocity of approximately 160 feet per minute.

What I claim is:

1. In a conveyor system for conveying articles around a gradually curving path whilst maintaining the articles in a horizontal plane, two endless belts of rectangular cross-section, a number of pulleys spaced apart along said curving path with their centres lying on two parallel curved lines, said pulleys lying in a horizontal plane with their axes of rotation vertical, each belt engaging the periphery of those pulleys whose centres lie on one of the parallel curved lines respectively, means engaging the sides and undersurface of that portion of each belt which is in engagement with the pulleys for maintaining said portion of each belt with its major surfaces in substantially vertical planes and with the upper edge of each portion of the belts in the same horizontal plane, and means for driving said portion of each belt in the same direction to convey articles resting on the upper edge of each belt portion.

2. A conveyor system according to claim 1, comprising guide means mounted on either side of the curving path for guiding around the curving path articles resting on the belts.

3. A conveyor system according to claim 1, in which the means engaging the sides and undersurface of said portion of each belt comprises an elongated member having a groove in its upper surface in which said portion of a belt fits, the upper edge of the belt projecting above the surface of said elongated member.

4. In a conveyor system for conveying articles in a horizontal plane around a curved path, two endless belts of rectangular cross-section, means for driving said belts around a closed track, four belt supporting pulleys, each pulley supporting one of the belts at one end of its track, four belt guiding pulleys spaced apart along a curved path between the belt supporting pulleys at each end of the track of one belt, said guiding pulleys lying in a common plane and being mounted with their axes of rotation vertical, four further belt guiding pulleys spaced apart along a curved path which is parallel to the curved path on which the first-mentioned guiding pulleys lie, said further belt guiding pulleys lying in said common plane and being mounted with their axes of rotation vertical, said first mentioned guiding pulleys causing a span of one belt to travel in an approximately curved path with the major surfaces of the belt lying in substantially vertical planes and said further guiding pulleys causing a span of the other belt to travel parallel to the span of said one belt, the upper edges of each span lying in the same horizontal plane, means for maintaining each of the belt spans in position with their major surface vertical by engagement with the lower edge and the sides of the belt, the two parallel spans of the belts being moved by said belt moving means in the same direction to convey articles resting on the upper edges of said spans around the approximately curved path described by the parallel spans, and guide means mounted on either side of the curved path for preventing articles being conveyed therealong from inadvertently leaving the belts.

5. A conveyor system according to claim 4, in which the means for maintaining each of the belt spans in position comprises a member having a longitudinal groove therein, the depth of said groove being less than the major cross-sectional dimension of said belt, whereby the upper edge of the belt projects above the surface of said member.

References Cited in the file of this patent

UNITED STATES PATENTS

| | | |
|---|---|---|
| 1,476,936 | Walden | Dec. 11, 1923 |
| 1,969,809 | Mann | Aug. 14, 1934 |
| 2,149,563 | Warner | Mar. 7, 1939 |